(12) United States Patent
Sherman

(10) Patent No.: US 7,671,976 B2
(45) Date of Patent: Mar. 2, 2010

(54) SYSTEMS AND METHODS OF USING A FLEXIBLE IMAGING SURFACE TO CAPTURE A ROLLED FINGERPRINT

(75) Inventor: Todd S. Sherman, Orlando, FL (US)

(73) Assignee: Lockheed Martin Corporation, Orlando, FL (US)

( * ) Notice: Subject to any disclaimer, the term of this patent is extended or adjusted under 35 U.S.C. 154(b) by 300 days.

(21) Appl. No.: 11/446,685

(22) Filed: Jun. 5, 2006

(65) Prior Publication Data

US 2007/0279617 A1  Dec. 6, 2007

(51) Int. Cl.
*G06K 9/74* (2006.01)

(52) U.S. Cl. .......................................... 356/71; 356/445

(58) Field of Classification Search .................... 356/71, 356/305, 394, 445, 446, 448; 382/124, 116, 382/126
See application file for complete search history.

(56) References Cited

U.S. PATENT DOCUMENTS

| | | | |
|---|---|---|---|
| 4,120,585 A | | 10/1978 | Depalma et al. |
| 4,322,163 A | * | 3/1982 | Schiller ........................ 356/71 |
| 5,991,467 A | * | 11/1999 | Kamiko ........................ 382/312 |
| 6,818,963 B1 | | 11/2004 | Chiu ............................ 257/433 |
| 2001/0050765 A1 | * | 12/2001 | Antonelli et al. ............... 356/71 |
| 2006/0075831 A1 | | 4/2006 | Okuda |

FOREIGN PATENT DOCUMENTS

| | | |
|---|---|---|
| EP | 0304092 A1 | 2/1989 |
| EP | 0514182 A1 | 11/1992 |
| JP | 09167224 A | 6/1997 |

OTHER PUBLICATIONS

UK Patent Search Report for GB0617949.3, Jan. 4, 2007, 1 page.
Dennis Curtin, "The Digital Image and Image Sensor", Copyright 2000, Chapter 1, Section 1.5 Area Array and Linear Image Sensors, 2 pages.
Carnegie Mellon, "Data Privacy Lab", Fingerprint Science Group, Fall 2005, "HandShot: A Fast 3-D Imaging System for Capturing Fingerprints, Palm Prints and Hand Geometry", Latanya Sweeney, Victor Weedn, Ralph Gross, 2 pages.

* cited by examiner

*Primary Examiner*—Gregory J Toatley, Jr.
*Assistant Examiner*—Tri T Ton
(74) *Attorney, Agent, or Firm*—Husch Blackwell Sanders Welsh & Katz

(57) ABSTRACT

Fingers and palms can be optically scanned to produce optical finger or optical palm prints by using one or more flexible imaging members in contact therewith. The palm or finger being scanned is positioned on one side of the flexible imaging member and in contact therewith. One or more optical scanners is positioned on the other side of the imaging member. The sensor(s) then sense incident radiant energy or light indicative of friction ridge patterns and minutiae on the respective finger and/or palm. Alternately, RF or electrostatic sensing could be used.

9 Claims, 2 Drawing Sheets

SYSTEMS AND METHODS OF USING A FLEXIBLE IMAGING SURFACE TO CAPTURE A ROLLED FINGERPRINT

FIELD

The invention pertains to devices and methods for scanning fingerprints. More particularly, the invention pertains to such devices and methods wherein flexible imaging materials are used to conform to the shape of the respective finger or fingers to produce higher quality fingerprint ridge impressions.

BACKGROUND

Known techniques and devices to digitally capture a rolled fingerprint from an individual require that the respective finger or fingers be physically rolled against a hard, glass or plastic, imaging surface. This requires that the person taking the image have enough skill to capture the print. This has also been recognized to be a relatively slow and error prone process.

The purpose of pressing the finger for fingers against a hard surface is to accentuate the contrast between the ridges and valleys of the fingerprint thus enhancing the quality of the data obtained during the scanning process. In addition to the amount of time the process takes, it is often considered too difficult for many types of security applications such as access control.

Alternately, fingerprints, palm prints and hand symmetry can be captured by using a plurality of video cameras. The cameras are oriented at different angles so as to focus on right and left hand non-contact placement areas. All ten digits and both palms can be captured simultaneously. Such configurations eliminate the use of a glass or plastic imaging surface and achieve contact-less capture of the finger and palm prints. Such systems, unfortunately, being contact-less do not provide the accentuated contrast achievable with traditional rolled fingerprinting.

Thus there continue to be needs for improved techniques and devices to capture rolled fingerprints. Preferably it would desirable to be able to capture multiple fingerprint images simultaneously and in a way so as to reduce acquisition errors. It would also be desirable to be able to speed the process and to reduce the level of skill required to successfully capture rolled prints. In fact, it would be desirable to be able to do so without operators or with operators having minimal training.

DETAILED DESCRIPTION

Figure 1A:
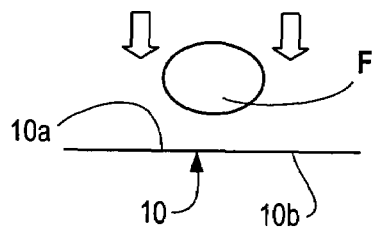
FIGS. 1A-1D taken together illustrate various aspects of a method in accordance with the present invention.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

In accordance herewith, embodiments of the invention incorporate thin, transparent and flexible sheet members, such as plastic sheet, which can conform to the shape of a finger. Such imaging members result in a greater area of fingerprint ridge impressions which can be captured by a scanner. As a result, more minutia points, and thus higher quality data can be obtained which can then be compared against one or more perspective matches. Embodiments of the present invention are particularly advantageous in that the use of such flexible imaging surfaces result in quick and easy capture of a rolled fingerprint without any rolling motion. Minimal skill is required of the person taking the prints.

A method which embodies the invention includes pressing a subject finger against a thin flexible and transparent imaging surface. The surface conforms to the shape of the finger as pressure is applied but without any rolling motion of the finger. The ridges and valleys on the finger are accentuated while in contact with the imaging surface. The subject finger can then be scanned by one or more optical scanners. The scanners scan the finger across the curvature of the flexible imaging surface.

It will also be understood that radio frequency (RF) or electro-static, capacitive, scanning could be used. Neither the exact structure nor the details of the scanner's technology are limitations of the invention.

An apparatus which embodies the invention can incorporate one or more fingerprint scanning regions. Each of the regions includes a flexible transparent imaging surface.

A finger or fingers to be scanned are placed against a first side of the respective imaging surface. One or more scanners, associated with each respective finger, can then scan the finger tip, through the imaging surface and along the curvature of the deflected imaging surface.

Scanning can be carried out by one or more removable linear arrays. Alternately, one or more multidimensional arrays could be used. In one embodiment of the invention, the multi-dimensional arrays could exhibit a curvature in accordance with the curvature of the deflected imaging surface.

Acquired data can be stored locally and analyzed. Alternately, the acquired data can be forwarded to a recognition system for analysis.

Figure 1B:
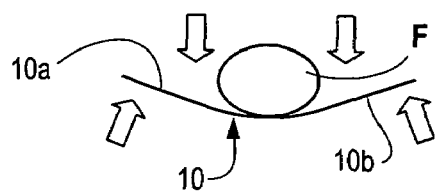
Figure 1C:
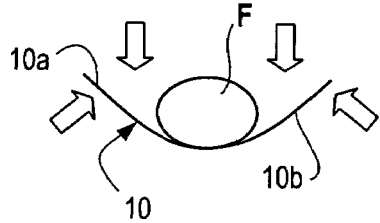
Figure 1D:
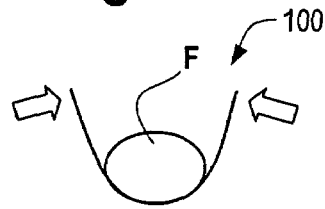

FIGS. 1A-1D illustrate aspects of a method 100 in accordance with the invention. FIGS. 1A-1D are end elevational views which illustrate a finger F to be scanned moving into contact with a thin, flexible, transparent imaging member 10. Imaging member 10 has first and second surfaces 10a, b. As illustrated in FIGS. 1A-1D as the finger F moves toward the imaging surface 10, it comes into contact with the first surface 10a of the imaging member 10. As the finger F continues to move toward the imaging member 10, it deflects same along a curve as illustrated in FIGS. 1B, 1C and 1D.

The finger F is illustrated in FIG. 1D in scanning position with the surface 10a of the member 10 deflected by the adjacent surface of the finger F. The ridges and valleys on the finger F are accentuated since they are now in contact with first surface 10a of the imaging member.

Figure 2A:
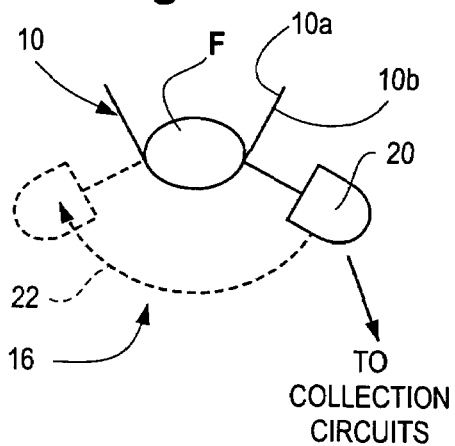
FIG. 2A illustrates aspects of a finger print scanner in accordance with the invention.
Figure 2B:
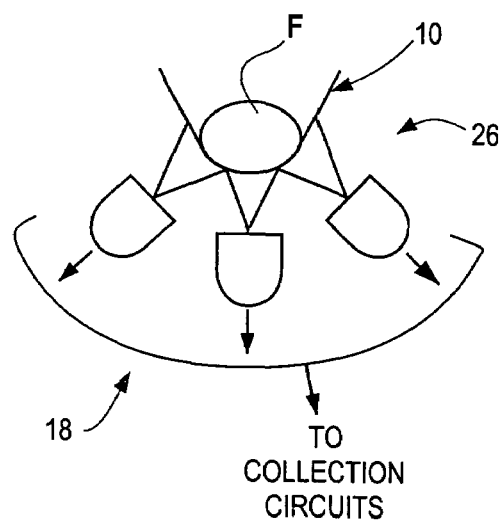
FIG. 2B illustrates aspects of an alternate form of a fingerprint scanner in accordance with the invention.

FIGS. 2A and 2B illustrate two alternative optical scanner configurations 16 and 18. Configure 16 of FIG. 2A incorporates a single, preferably linear, optical scanner or radiant energy sensor 20. The sensor 20 is moved along an arc indicated generally at 22 which conforms to the curvature of the imaging member 10 from an initial position to a final position, indicated in phantom. Light, or, photons reflected off of the finger F and transparent imaging member 10 are sensed by the array 20 as it moves end to end along curvature 22.

In an alternate configuration 18, illustrated in FIG. 2B, a plurality of sensors or scanners 26 arranged so as to sense the shape of the fingertip F, simultaneously, along the curvature of the finger F and imaging member 10.

Outputs from the scanners 20, 26 can be coupled to local collection circuitry for analysis or forwarding to a displaced analysis system. It will be understood that neither the exact configuration of the sensors 20, 26 nor their arrangement relative to the imaging member 10 are limitations of the present invention. A variety of configurations thereof come within the spirit and scope of the present invention. FIGS. 2A, 2B illustrate the member 10 curved about a portion of the finger F with scanning of the finger F taking place along an arc relative to the finger that exceeds ninety degrees.

Figure 3:
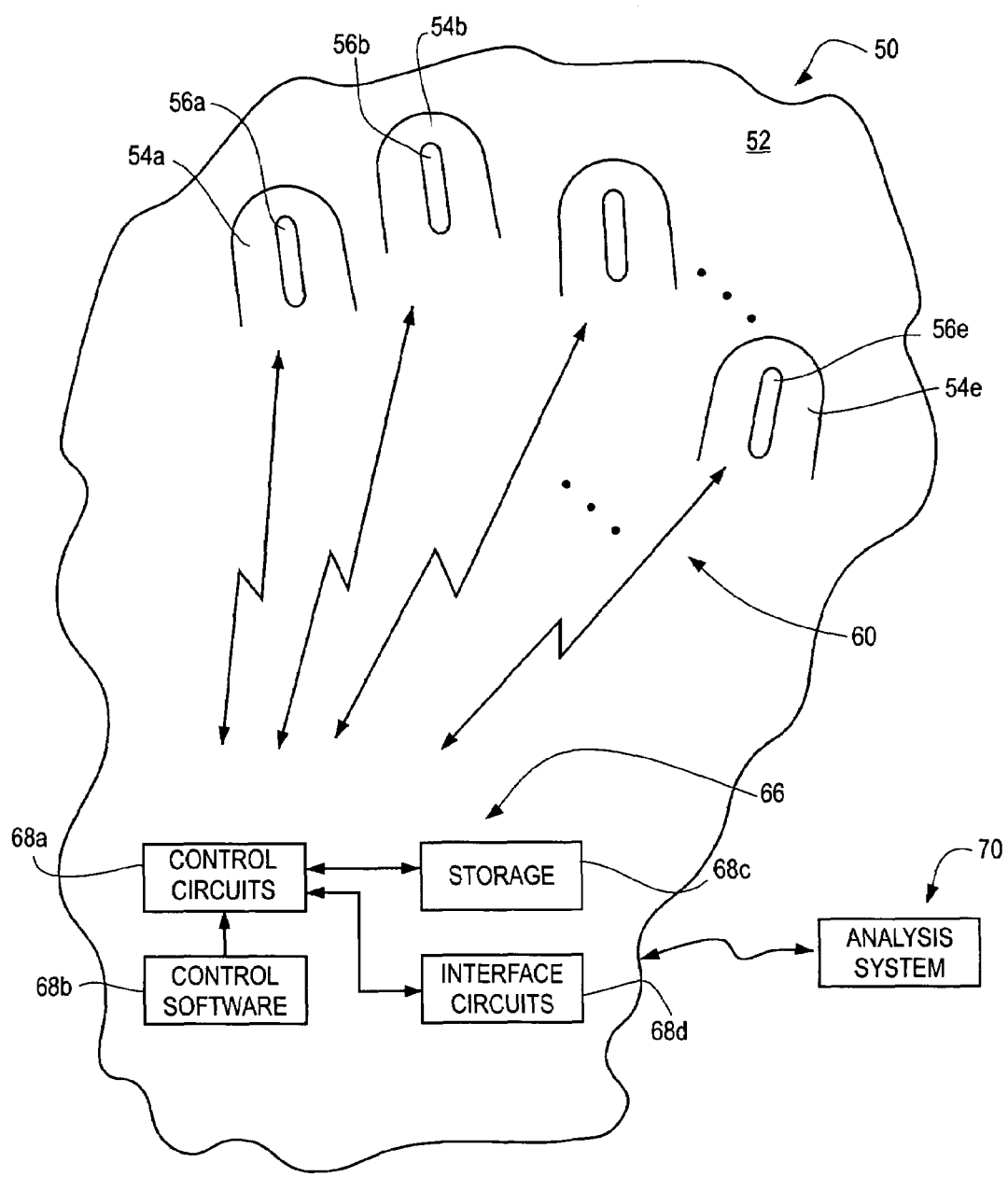
FIG. 3 is a block diagram of an apparatus for simultaneously obtaining a plurality of fingerprints from an individual in accordance with the invention.

FIG. 3 illustrates a multi-finger scanner 50. The scanner 50 is carried by a housing 52 which can be in any convenient shape or form.

The housing 52 carries a plurality of appropriately positioned or spaced apart imaging members 54a, 54b, 54c, 54d and 54e. The imaging members are arranged such that an individual can conveniently place each five fingers of a hand thereon simultaneously. The respective imaging members, such as member 54e, deflect in accordance with the pressure applied by the respective finger, best seen in FIG. 1D.

A scanner configuration, indicated at 56a . . . 56e is located in housing 52 behind a respective imaging member 54a . . . 54e. The arrangement of FIG. 3 protects the respective scanning configuration from oily fingers, moisture or abuse. Scanners could be implemented with optical sensing, RF sensing, or capacitive-type sensing, without limitation.

Scanning of the respective fingers can take place simultaneously using either of the scanning configurations 16, 18 discussed previously. Data, indicated generally at 60, from each of the fingers being sensed via the respective sensors such as 56a . . . 56e can then be coupled to local collection circuits indicated generally at 66.

The local collection circuitry 66 can include control circuitry 68a which can be implemented as one or more programmable processors which execute control software 68b. Storage 68c can be provided for temporary storage of the fingerprint data 60.

Analysis can be carried out locally by the control circuits and software 68a, b. Alternately, the data 60 could be transmitted via interface circuitry 68d to a displaced analysis or recognition system 70. It will be understood that the exact form of the analysis carried out by the system 70 is not a limitation of the present invention.

Depending on the application, multiple units 50 can be provided appropriately configured such that an individual could place both hands on a respective imaging apparatus simultaneously to further shorten the scanning time. All such arrangements come within the spirit and scope of the present invention.

It will also be understood that the imaging member could be configured, with an associated array, as a palm scanner without departing from the spirit and scope of the present invention. Further, the nature of the imaging member 10 is also not a limitation of the present invention. In addition to being deflectable, the imaging member could be stretchable to potentially further enhance accentuation of the ridges and valleys on the respective finger.

From the foregoing, it will be observed that numerous variations and modifications may be effected without departing from the spirit and scope of the invention. It is to be understood that no limitation with respect to the specific apparatus illustrated herein is intended or should be inferred.

It is, of course, intended to cover by the appended claims all such modifications as fall within the scope of the claims.

The invention claimed is:

1. An apparatus comprising:
a flexible plastic sheet member, the member has first and second sides; a plurality of spaced apart sensors, the sensors are located on one side of the member displaced therefrom and not in contact with the sheet member, the sensors are oriented to sense at least one of, radiant energy reflected off of a subject located on the other side of the member and in contact therewith, an electrical signal indicative of a capacitance value varied by a subject located on the other side of the member and in contact therewith, or, a radio frequency signal varied by a subject located on the other side of the member and in contact therewith where the sheet member curves around at least a portion of the subject along an arc which exceeds ninety degrees and where the sensors are located along the arc and scan the member along the arc.

2. An apparatus as in claim 1 where the sensor includes an array of optical elements each of which is responsive to incident radiant energy.

3. An apparatus as in claim 1 which includes a plurality of flexible sheet members and a plurality of adjacent radiant energy sensors.

4. An apparatus is in claim 1 where the sheet member and the sensor are at least intermittently movable relative to one another.

5. An apparatus comprising:
a flexible sheet member with a transparent, flexible and stretchable imaging region, the member has first and second sides; at least one sensor, the sensor is located on one side of the member displaced from the imaging region, the sensor is oriented to sense radiant energy reflected off of a subject located on the other side of the member and in contact therewith, where the sensor includes at least one optical element which is responsive to incident radiant energy and wherein as the subject moves into contact with the member, both sides move toward the sensor and the member curves and comes into contact with the subject along an arc which exceeds ninety degrees and which includes a plurality of sensors located on the one side of the member, at least some of the sensors are spaced apart from one another and from the imaging region wherein the sensors scan the member along the arc and are located along the arc.

6. A fingerprint scanner comprising:
a flexible plastic sheet member, the member has first and second spaced apart surfaces;
at least one sensing array, the array is displaced from and not in contact with the plastic sheet member where the array is adjacent to the first surface and where the second surface has a region for receipt of a finger to be scanned with the sheet member positioned, at least in part, between a finger being scanned and the sensing array and where the sensing array comprises one of a linear array, arcuately movable relative to the sheet member, between first and second positions, or, a curved multi-element, multi-dimensional arcuately arranged array where the flexible sheet member is also stretchable and curves around, at least in part the finger being scanned along an arc that exceeds ninety decrees where the members of the array scan the member along the arc and are located along the arc.

7. A scanner as in claim 6 where the sensing array implements one of optical sensing, radio-frequency sensing, or electrostatic sensing.

8. A method of capturing a fingerprint in the absence of a rolling motion comprising:

providing a flexible, transparent plastic sheet member;

moving a finger to be scanned toward one side of a portion of the sheet member thereby contacting, deflecting and conforming the sheet member to a curved shape of that part of the finger in contact therewith; and arcuately scanning the curved shape of the finger in contact with the sheet member along an arc which exceeds ninety degrees where the scanning takes place from another side of the sheet member, displaced therefrom and not in contact with the sheet member and which includes providing scanners which scan the member along the arc and which are located along the arc.

9. A method of capturing a fingerprint in the absence of a rolling motion comprising:

providing a flexible, transparent plastic sheet member;

moving a finger to be scanned toward one side of a portion of the sheet member thereby contacting, deflecting and conforming the sheet member to a curved shape of that part of the finger in contact therewith; and arcuately scanning the curved shape of the finger in contact with the sheet member where the curved shape of the sheet member corresponds to an arc which exceeds ninety degrees and which includes providing scanners which scan the member along the arc and which are located along the arc.

* * * * *